(12) United States Patent
Ruff et al.

(10) Patent No.: US 11,597,245 B2
(45) Date of Patent: Mar. 7, 2023

(54) ELECTRIC SCOOTER HITCH ASSEMBLY

(71) Applicant: Mod.al Group, Inc., American Fork, UT (US)

(72) Inventors: Preston Ruff, Draper, UT (US); Kreg Peeler, Draper, UT (US)

(73) Assignee: Mod.al Group, Inc., American Fork, UT (US)

( * ) Notice: Subject to any disclaimer, the term of this patent is extended or adjusted under 35 U.S.C. 154(b) by 29 days.

(21) Appl. No.: 17/396,295

(22) Filed: Aug. 6, 2021

(65) Prior Publication Data

US 2023/0041861 A1 Feb. 9, 2023

(51) Int. Cl.
*B60D 1/52* (2006.01)
*B60D 1/155* (2006.01)
*B60D 1/01* (2006.01)
*B60D 1/00* (2006.01)

(52) U.S. Cl.
CPC .............. *B60D 1/52* (2013.01); *B60D 1/01* (2013.01); *B60D 1/155* (2013.01); *B60D 2001/005* (2013.01); *B60D 2001/006* (2013.01)

(58) Field of Classification Search
CPC ........................................................ B60D 1/52
See application file for complete search history.

(56) References Cited

U.S. PATENT DOCUMENTS

| | | | |
|---|---|---|---|
| 1,779,192 A * | 10/1930 | Signer .................... | B60D 1/143 280/495 |
| 3,549,174 A * | 12/1970 | Miles ..................... | B60D 1/04 280/495 |
| 4,047,734 A * | 9/1977 | Miles ..................... | B60D 1/143 280/495 |
| 7,044,488 B1 | 5/2006 | Hamend | |
| 7,503,573 B2 * | 3/2009 | Finlaw .................... | B62J 50/40 224/454 |
| 9,776,069 B2 * | 10/2017 | Mckay .................... | A63C 17/26 |
| 2012/0248720 A1 * | 10/2012 | Grata ...................... | B60D 1/01 280/47.4 |
| 2016/0347389 A1 | 1/2016 | Boggess | |
| 2017/0341698 A1 * | 11/2017 | McManus ............ | B62K 27/003 |

FOREIGN PATENT DOCUMENTS

| | | | |
|---|---|---|---|
| DE | 814256 C | 9/1951 | |
| DE | 102021103039 A1 * | 4/2022 | |
| FR | 2965244 A1 | 3/2012 | |
| FR | 3094921 A1 * | 10/2020 | ............ B60D 1/665 |
| FR | 3094950 A1 * | 10/2020 | ........... B62D 53/005 |
| FR | 3094950 A1 | 10/2020 | |
| RU | 77826 U1 * | 11/2008 | |
| WO | 02/08049 A1 | 1/2002 | |

OTHER PUBLICATIONS

International Searching Authority, International Search Report and the Written Opinion, dated Nov. 4, 2022.

* cited by examiner

*Primary Examiner* — Kevin Hurley
(74) *Attorney, Agent, or Firm* — Kirton McConkie; Brian Tucker

(57) ABSTRACT

An electric scooter hitch assembly is configured to be quickly attached to and removed from an electric scooter. The hitch assembly provides a mechanism for selectively securing a carry-on or other towable item to a variety of electric scooters. The hitch assembly is compact and easily transportable thereby making it an ideal solution for a rider to temporarily adapt an electric scooter, including rental electric scooters, to transport towable items such as trailers, luggage, carts, or other suitable items.

20 Claims, 5 Drawing Sheets

ELECTRIC SCOOTER HITCH ASSEMBLY

CROSS-REFERENCE TO RELATED APPLICATIONS

N/A

BACKGROUND

Electric scooters have become an integral part of inner-city transport and pedestrian transit to and from businesses, universities, schools, airports, hotels, and business and social gatherings. Riding an electric scooter with any type of carry-on including backpacks, luggage, purchased retail items, and bags can be cumbersome, if not impossible. For example, the deck plate of the electric scooter is too narrow for securing bulky or heavy items.

To enable a rider to transport luggage or other loads, some users have fabricated their own solutions and attached them to their personal electric scooters. While these solutions may be practical for personal use with personal equipment, they can permanently alter the scooter, may require invasive installation with specific tools, and would not be a viable option for the electric scooter fleets meant for scooter sharing systems.

BRIEF SUMMARY

The present invention extends to an electric scooter hitch assembly that can be quickly attached to and removed from an electric scooter. The hitch assembly provides a mechanism for selectively securing a carry-on or other towable item to a variety of electric scooters. The hitch assembly is compact and easily transportable thereby making it an ideal solution for a rider to temporarily adapt an electric scooter, including rental electric scooters, to transport a carry-on.

In some embodiments, the present invention may be implemented as a hitch assembly for a scooter that includes a base assembly having a first brace and a second brace that are configured to be selectively secured to a deck of a scooter. The hitch assembly may also include an arm assembly having an extension arm that extends from the base assembly. The extension arm may be configured to secure a towable item.

In some embodiments, the first brace includes a slot and the second brace includes an interlocking member that inserts into the slot to secure the first and second braces together.

In some embodiments, the interlocking member slides within the slot to adjust a width of the base assembly.

In some embodiments, the interlocking member comprises a post and a tab.

In some embodiments, the tab is configured to prevent the interlocking member from passing through the slot when the first and second braces are aligned.

In some embodiments, the second brace includes retaining walls and the first brace slides within the retaining walls.

In some embodiments, the first and second braces include bends that correspond with opposing edges of the deck.

In some embodiments, the bends cause outer ends of the first and second braces to be positioned below the deck.

In some embodiments, the base assembly includes clamping assemblies coupled to outer ends of the first and second braces.

In some embodiments, each clamping assembly includes a clamp arm.

In some embodiments, each clamping assembly includes a quick release assembly for selectively tightening the respective clamp arm to an underside of the deck.

In some embodiments, each clamp arm includes a foot.

In some embodiments, the extension arm is configured to pivot relative to the base assembly.

In some embodiments, the arm assembly includes a first knob assembly for securing the extension arm in a desired orientation relative to the base assembly.

In some embodiments, the arm assembly includes a second knob assembly for securing the towable item.

In some embodiments, the hitch assembly may include one or more adapters that are configured to be coupled to the extension arm via the second knob assembly.

In some embodiments, the present invention may be implemented as a hitch assembly for a scooter that includes a first brace, a second brace that is configured to telescope with the first brace to thereby cause a combined width of the first brace and the second brace to correspond to a width of a deck of a scooter, a first clamping assembly that is connected to the first brace and configured to secure the first brace to the deck of the scooter, a second clamping assembly that is connected to the second brace and configured to secure the second brace to the deck of the scooter, and an extension arm that extends from the first brace or the second brace. The extension arm is configured to secure a towable item when the first brace and second brace are secured to the deck of the scooter.

In some embodiments, the first brace includes a slot and the second brace includes an interlocking member that slides within the slot to thereby enable the second brace to telescope with the first brace.

In some embodiments, the first clamping assembly includes a first clamp arm that extends under one side of the deck and the second clamping assembly includes a second clamp arm that extends under an opposing side of the deck.

In some embodiments, the present invention may be implemented as a hitch assembly for a scooter that includes a telescoping base assembly, a first clamping assembly for securing a first side of the telescoping base assembly to a first side of a deck of the scooter, a second clamping assembly for securing a second side of the telescoping base assembly to a second side of the deck of the scooter, and an arm assembly that is configured to secure a carry-on.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
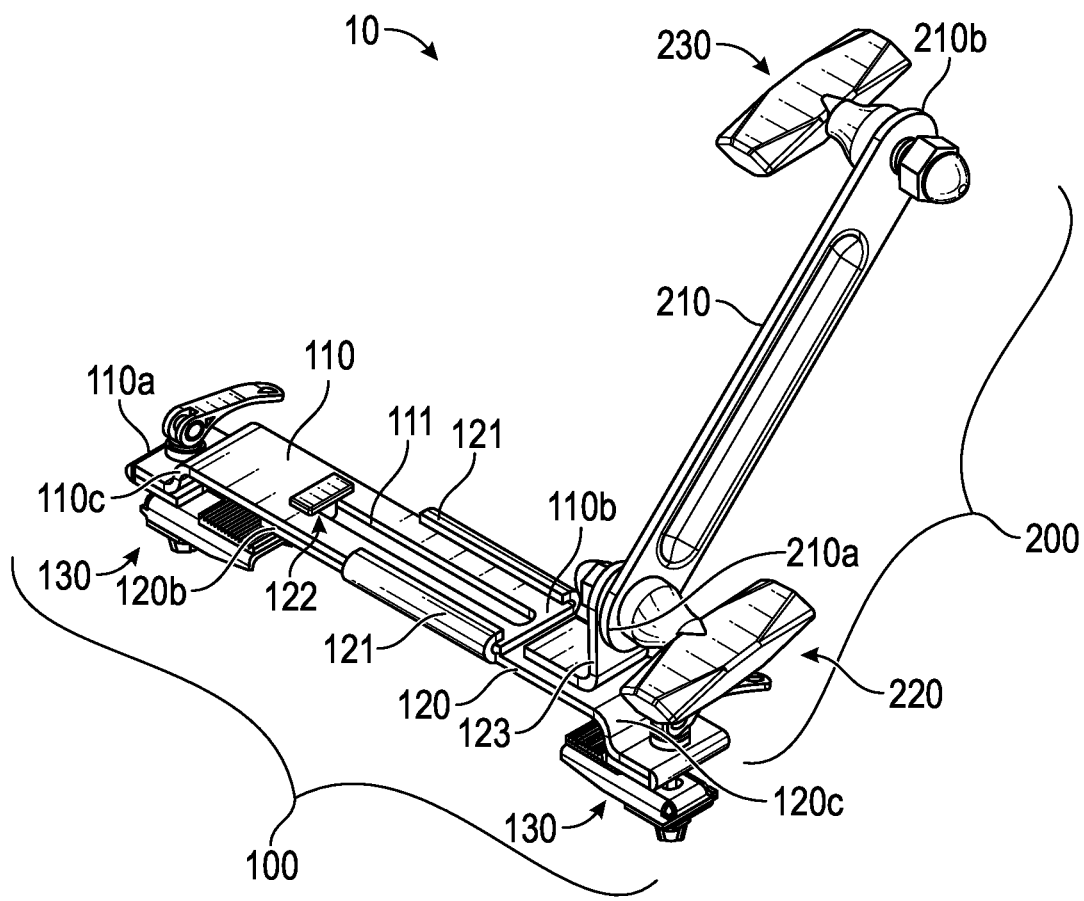
FIG. 1 provides an example of a hitch assembly that is configured in accordance with one or more embodiments of the present invention.
Figure 2:
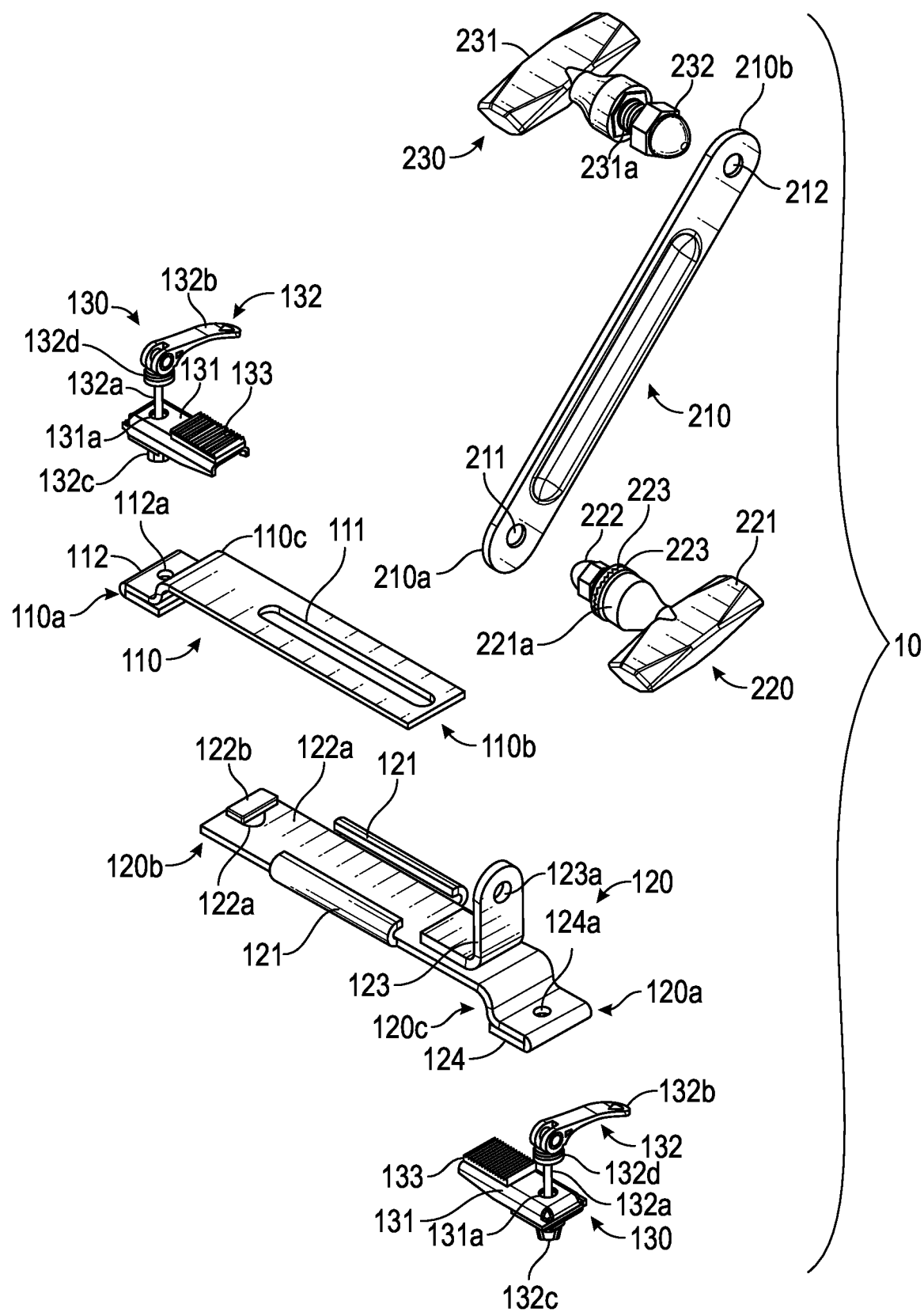
FIG. 2 is an exploded view of the hitch assembly of FIG. 1.
Figure 3:
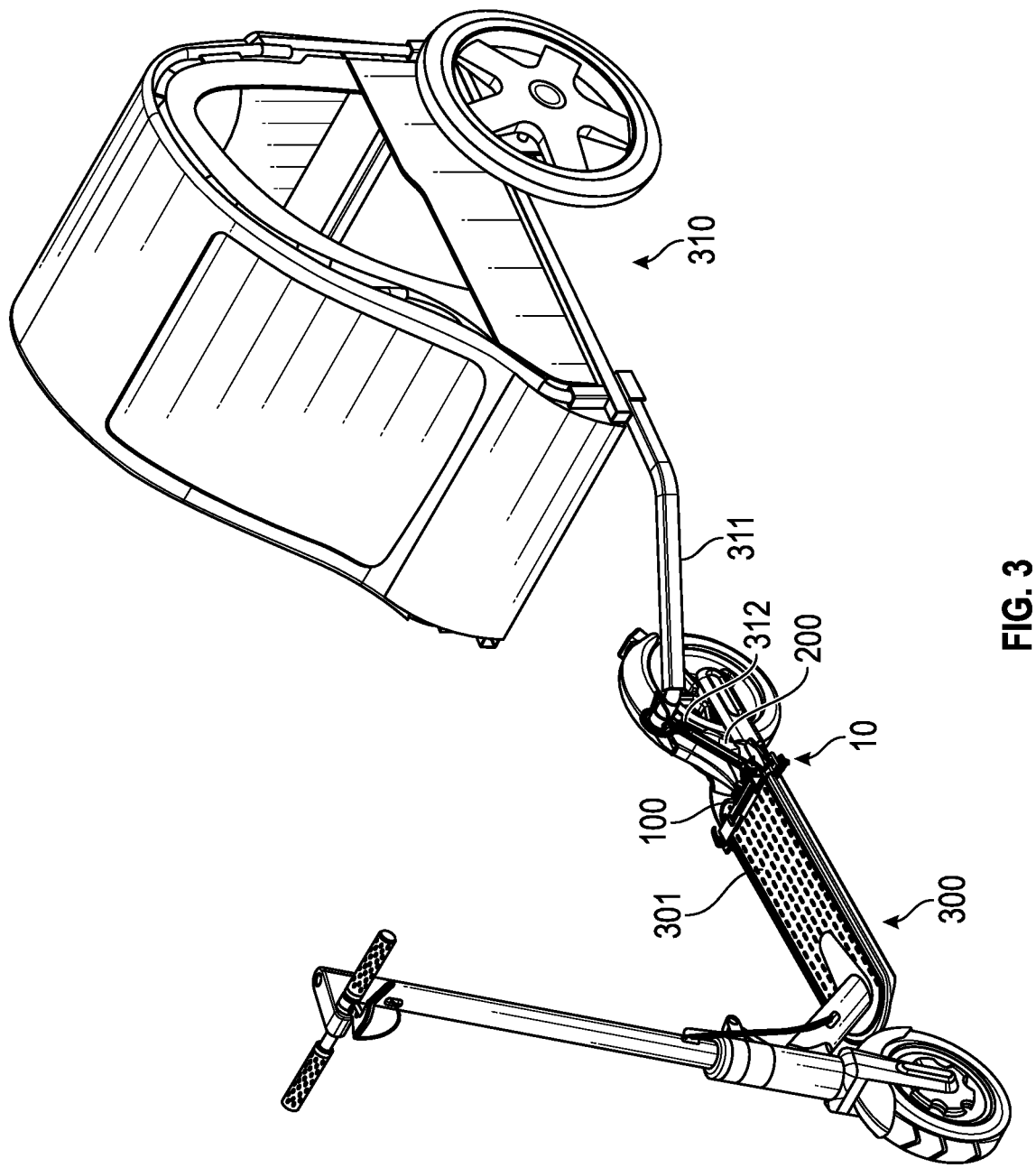
FIG. 3 provides an example of how the hitch assembly of FIG. 1 can be selectively connected to an electric scooter to allow a trailer to be towed behind the electric scooter.
Figure 3A:
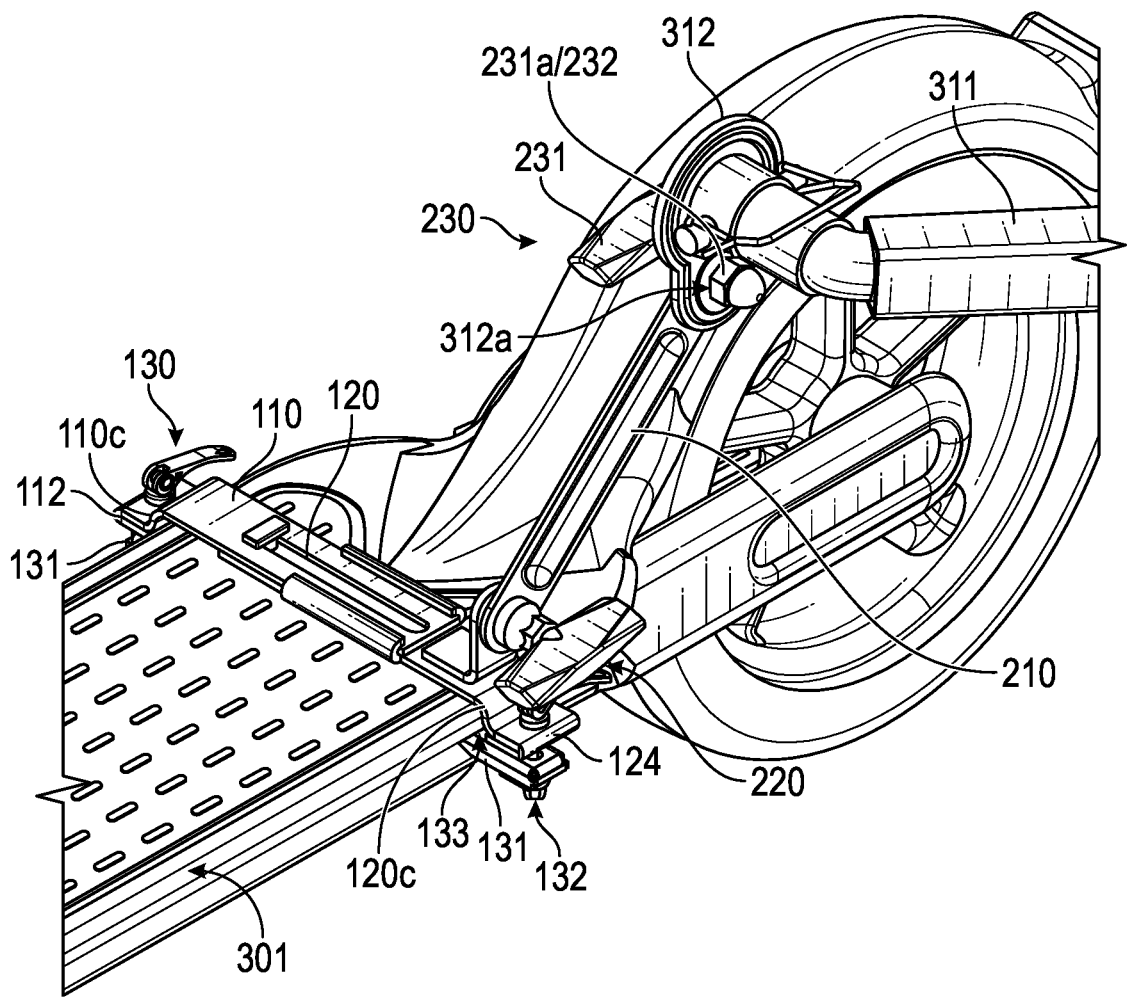
FIGS. 3A and 3B provide detailed views of the hitch assembly of FIG. 1 when connected to the electric scooter of FIG. 3.
Figure 3B:
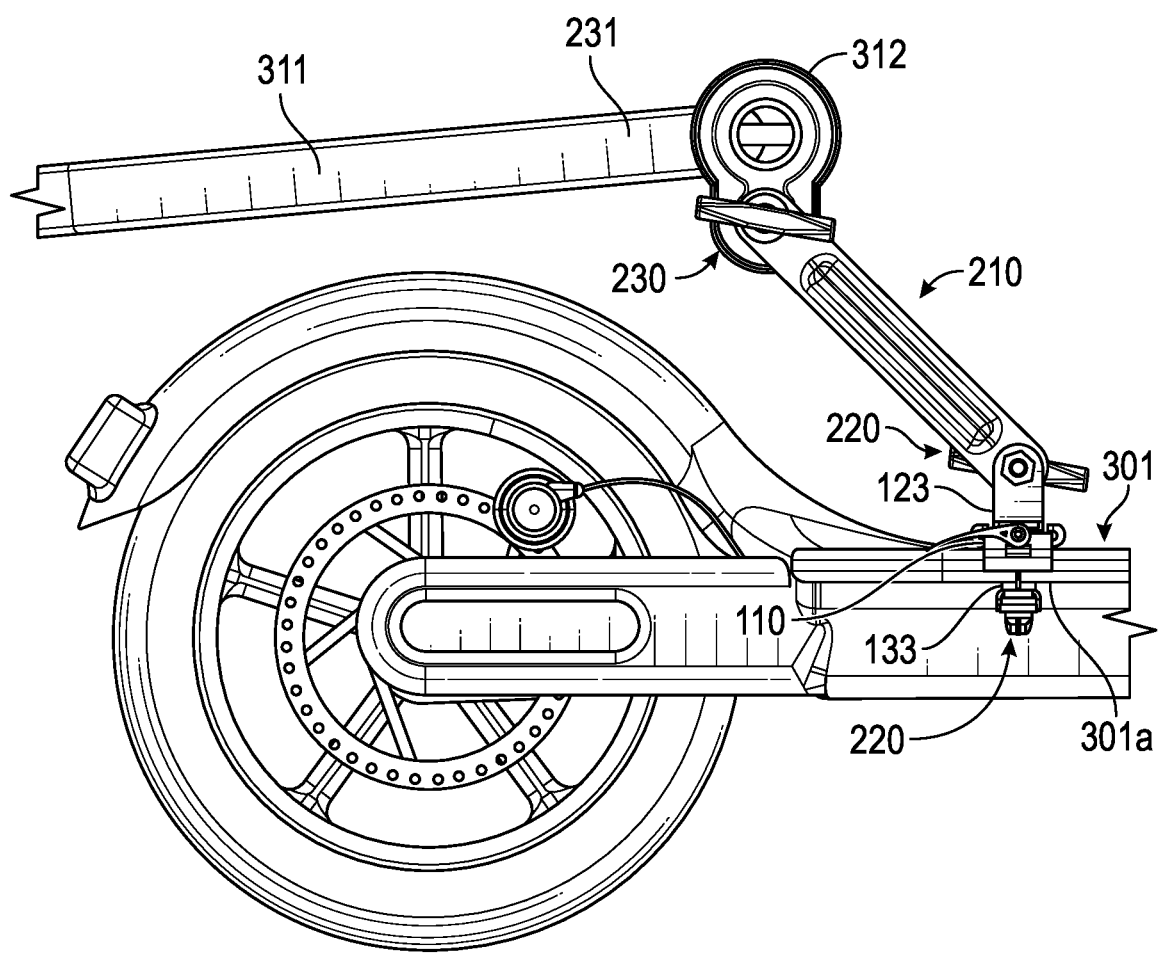

FIG. 1 is an isolated view of a hitch assembly 10 that is configured in accordance with embodiments of the present invention. FIG. 2 is an exploded view of hitch assembly 10. FIGS. 3, 3A and 3B show how hitch assembly 10 can be selectively secured to a deck 301 of an electric scooter 300 to enable a trailer 310 (or other towable items) to be towed behind electric scooter 300.

Hitch assembly 10 includes a base assembly 100 that is configured to selectively couple to the deck of a scooter, such as an electric scooter, and an arm assembly 200 that extends upwardly from base assembly 100 and is configured to allow a towable item to be secured to the scooter. Base assembly 100 includes a first brace 110 having an outer end 110a and an inner end 110b, and a second brace 120 having an outer end 120a and an inner end 120b.

First brace 110 and second brace 120 can be overlapped with one another and can be configured to telescope. For example, first brace 110 may include a slot 111 that extends from inner end 110b towards outer end 110a, and second brace 120 may include an interlocking member 122 that is positioned towards inner end 120b. Interlocking member 122 is configured to insert into and slide within slot 111 while also preventing first brace 110 and second brace 120 from separating. In some embodiments, interlocking member 122 may be formed of a post 122a that extends from the surface of first brace 110 and a tab 122b formed at the end (e.g., the top) of post 122a. Tab 122b can have a widthwise dimension that is greater than the width of slot 111 and a lengthwise dimension that is less than the width of slot 111 such that tab 122b cannot pass through slot 111 unless second brace 120 is oriented perpendicular to first brace 110. Notably, tab 122b can prevent second brace 120 from separating from first brace 110 when hitch assembly 10 is in use.

Second brace 120 may also include retaining walls 121 that are formed along the sides of second brace 120 and are positioned towards outer end 120a from interlocking member 122. When interlocking member 122 is secured within slot 111, inner end 110b of first brace 110 can be inserted between retaining walls 121 to a desired distance to cause the total width of base assembly 100 to correspond with the width of the deck of a scooter to which hitch assembly 10 is to be secured. In some embodiments, retaining walls 121 can extend upwardly and inwardly to thereby prevent lateral and vertical movement of first end 110b of first brace 110 relative to second brace 120.

First brace 110 and second brace 120 may include bends 110c and 120c towards outer ends 110a and 120a respectively. Bends 110c and 120c cause outer ends 110a and 120a to be positioned below the deck of the scooter when the remainder of first brace 110 and second brace 120 are positioned on or above the deck. In other words, bends 110c and 120c can conform to the edges of the deck. In some embodiments, outer ends 110a and 120a can be folded back onto themselves (or otherwise form a thickened area) to create a reinforced area 112 and 124 respectively at which a clamping assembly 130 is secured to outer ends 110a and 120a.

Clamping assembly 130 can include a clamp arm 131 that is configured to extend under the deck of a scooter (e.g., deck 301 of scooter 300) when first brace 110 and second brace 120 are positioned on top of and extend across the deck. Clamp arm 131 includes a hole 131a that can be aligned with a hole 112a or 124a in reinforced area 112 or 124 respectively so that a shaft 132a of a quick release assembly 132 can extend through the aligned holes. Quick release assembly 132 can also include a knob 132b that is coupled to a top end of shaft 132a and a nut 132c that is coupled to the bottom end of shaft 132a which retain quick release assembly 132 to the respective outer end 110a or 120a. A rider can rotate and pivot knob 132b to tighten clamp arm 131 against the underside of the deck. Quick release assembly 132 may include one or more washers 132 to facilitate this tightening. The top surface of each clamp arm 131 may include a rubber foot 133 that maximizes the clamping and retention force of clamp arm 131 against the underside of the deck.

Arm assembly 200 includes an extension arm 210 that extends upwardly and/or rearwardly from base assembly 100. For example, in some embodiments, second brace 120 (or possibly first brace 110) may include a flange (or bracket) 123 to which a bottom end 210a of extension arm 210 may couple. Flange 123 may include a hole 123a and bottom end 210a may include a corresponding hole 211 by which a knob assembly 220 secures extension arm 210 to flange 123 in a desired orientation. Knob assembly 220 may include a knob 221 from which a bolt 221a (not visible) extends, and a nut 222 for retaining bolt 221a within holes 123a and 211. Knob assembly 220 may also include lock washers 223 to prevent knob 221 from loosening.

Top end 210b of extension arm 210 may also include a hole 212 by which another knob assembly 230 may be secured to top end 210b. Knob assembly 230 may include a knob 231 from which a bolt 231a extends, and a nut 232 for retaining bolt 231a within hole 212.

FIGS. 3, 3A and 3B provide an example where a trailer 310 includes a towing arm 311 having an adapter 312 for connecting towing arm 311 to a bicycle. In such cases, if a rider of scooter 300 desired to tow trailer 310 behind scooter 300, he or she could place hitch assembly 10 on top of deck 301 with clamp arms 131 extending under opposing sides of deck 301. The rider could then manipulate quick release assemblies 132 to tighten clamp arms 131 against the underside of deck 301 and manipulate knob assembly 220 to orient extension arm 210 appropriately. The rider could then insert bolt 231a of knob assembly 230 through hole 212 and through a hole 312a in adapter 312 and tighten it to thereby secure trailer 310 to hitch assembly 10. The rider could then ride scooter 300 to pull trailer 310. Upon reaching his or her destination, the rider could quickly disconnect trailer 310 and remove hitch assembly 10 from deck 301 so that the rider can reuse hitch assembly 10 on the same scooter or another scooter at a later time.

FIGS. 3, 3A and 3B are intended to represent only one of many different towable items that can be selectively coupled to a scooter using hitch assembly 10. For example, hitch assembly 10 could include an adapter by which the handle of rolling luggage could be secured to extension arm 210. Any suitable adapter could be used with hitch assembly 10 to enable any reasonable item to be towed behind a scooter.

In summary, hitch adapter 10 is a portable, temporary, and quick solution for adapting a scooter, and particularly an electric scooter, for towing items. Riders of electric scooters may carry hitch adapter 10 when they travel or commute so that they can quickly adapt any rental electric scooter to pull a carry-on or other towable item. Similarly, owners of electric scooters may employ hitch adapter 10 to selectively adapt their scooters for towing when desired to thereby avoid the downsides and costs of permanent solutions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A scooter hitch assembly comprising:
   a base assembly having a first brace and a second brace that selectively secure the scooter hitch assembly to a deck of a scooter; and
   an arm assembly having an extension arm that extends from the base assembly, the extension arm being configured to secure a towable item.

2. The scooter hitch assembly of claim 1, wherein the first brace includes a slot and the second brace includes an interlocking member that inserts into the slot to secure the first and second braces together.

3. The scooter hitch assembly of claim 2, wherein the interlocking member slides within the slot to adjust a width of the base assembly.

4. The scooter hitch assembly of claim 3, wherein the interlocking member comprises a post and a tab.

5. The scooter hitch assembly of claim 4, wherein the tab is configured to prevent the interlocking member from passing through the slot when the first and second braces are aligned.

6. The scooter hitch assembly of claim 1, wherein the second brace includes retaining walls and the first brace slides within the retaining walls.

7. The scooter hitch assembly of claim 1, wherein the first and second braces include bends that correspond with opposing edges of the deck.

8. The scooter hitch assembly of claim 7, wherein the bends cause outer ends of the first and second braces to be positioned below the deck.

9. The scooter hitch assembly of claim 1, wherein the base assembly includes clamping assemblies coupled to outer ends of the first and second braces.

10. The scooter hitch assembly of claim 9, wherein each clamping assembly includes a clamp arm.

11. The scooter hitch assembly of claim 10, wherein each clamping assembly includes a quick release assembly for selectively tightening the respective clamp arm to an underside of the deck.

12. The scooter hitch assembly of claim 11, wherein each clamp arm includes a foot.

13. The scooter hitch assembly of claim 1, wherein the extension arm is configured to pivot relative to the base assembly.

14. The scooter hitch assembly of claim 13, wherein the arm assembly includes a first knob assembly for securing the extension arm in a desired orientation relative to the base assembly.

15. The scooter hitch assembly of claim 14, wherein the arm assembly includes a second knob assembly for securing the towable item.

16. The scooter hitch assembly of claim 15, further comprising:
    one or more adapters that are configured to be coupled to the extension arm via the second knob assembly.

17. A hitch assembly for a scooter comprising:
    a first brace;
    a second brace that is configured to telescope with the first brace to thereby cause a combined width of the first brace and the second brace to correspond to a width of a deck of a scooter;
    a first clamping assembly that is connected to the first brace and configured to secure the first brace to the deck of the scooter;
    a second clamping assembly that is connected to the second brace and configured to secure the second brace to the deck of the scooter; and
    an extension arm that extends from the first brace or the second brace, the extension arm being configured to secure a towable item when the first brace and second brace are secured to the deck of the scooter.

18. The hitch assembly of claim 17, wherein the first brace includes a slot and the second brace includes an interlocking member that slides within the slot to thereby enable the second brace to telescope with the first brace.

19. The hitch assembly of claim 17, wherein the first clamping assembly includes a first clamp arm that extends under one side of the deck and the second clamping assembly includes a second clamp arm that extends under an opposing side of the deck.

20. A hitch assembly for a scooter comprising:
    a telescoping base assembly;
    a first clamping assembly for securing a first side of the telescoping base assembly to a first side of a deck of the scooter;
    a second clamping assembly for securing a second side of the telescoping base assembly to a second side of the deck of the scooter; and
    an arm assembly that is configured to secure a carry-on.

* * * * *